J. B. MAINVILLE.
MEAT HOLDER.
APPLICATION FILED NOV. 27, 1917.

1,289,848. Patented Dec. 31, 1918.
2 SHEETS—SHEET 1.

Inventor

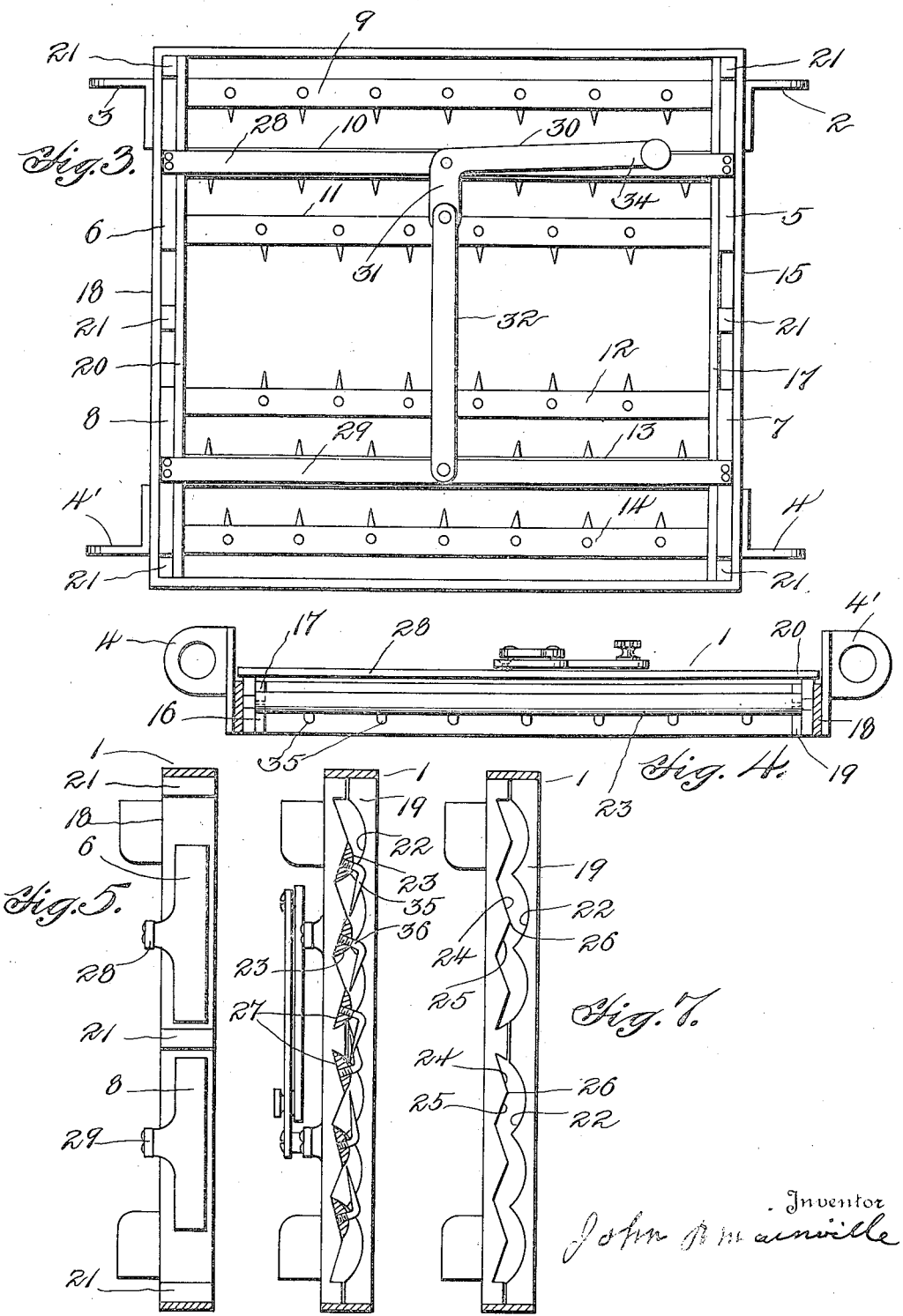

UNITED STATES PATENT OFFICE.

JOHN B. MAINVILLE, OF DETROIT, MICHIGAN.

MEAT-HOLDER.

1,289,848.  Specification of Letters Patent.  Patented Dec. 31, 1918.

Application filed November 27, 1917. Serial No. 204,197.

*To all whom it may concern:*

Be it known that I, JOHN B. MAINVILLE, a citizen of the United States, residing at Detroit, in the county of Wayne and State of Michigan, have invented certain new and useful Improvements in Meat-Holders, of which the following is a specification.

This invention relates to improvements in meat slicing machines, and has for its object to provide a meat clamp therefor.

Another object of the invention is to provide in combination with a meat slicing machine a clamp so formed that a piece of meat may be completely sliced.

With the above and other objects in view, I have invented the device illustrated in the accompanying drawings in which, Figure 1 is a front elevational view of my device;

Fig. 3 is a similar view shown in another position;

Fig. 4 is a section on the line A—A of Fig. 1;

Fig. 5 is a section on the line B—B of Fig. 1;

Fig. 6 is a section on the line C—C of Fig. 1;

Fig. 7 is a similar view with the hook bars removed.

Figures 1, 2:
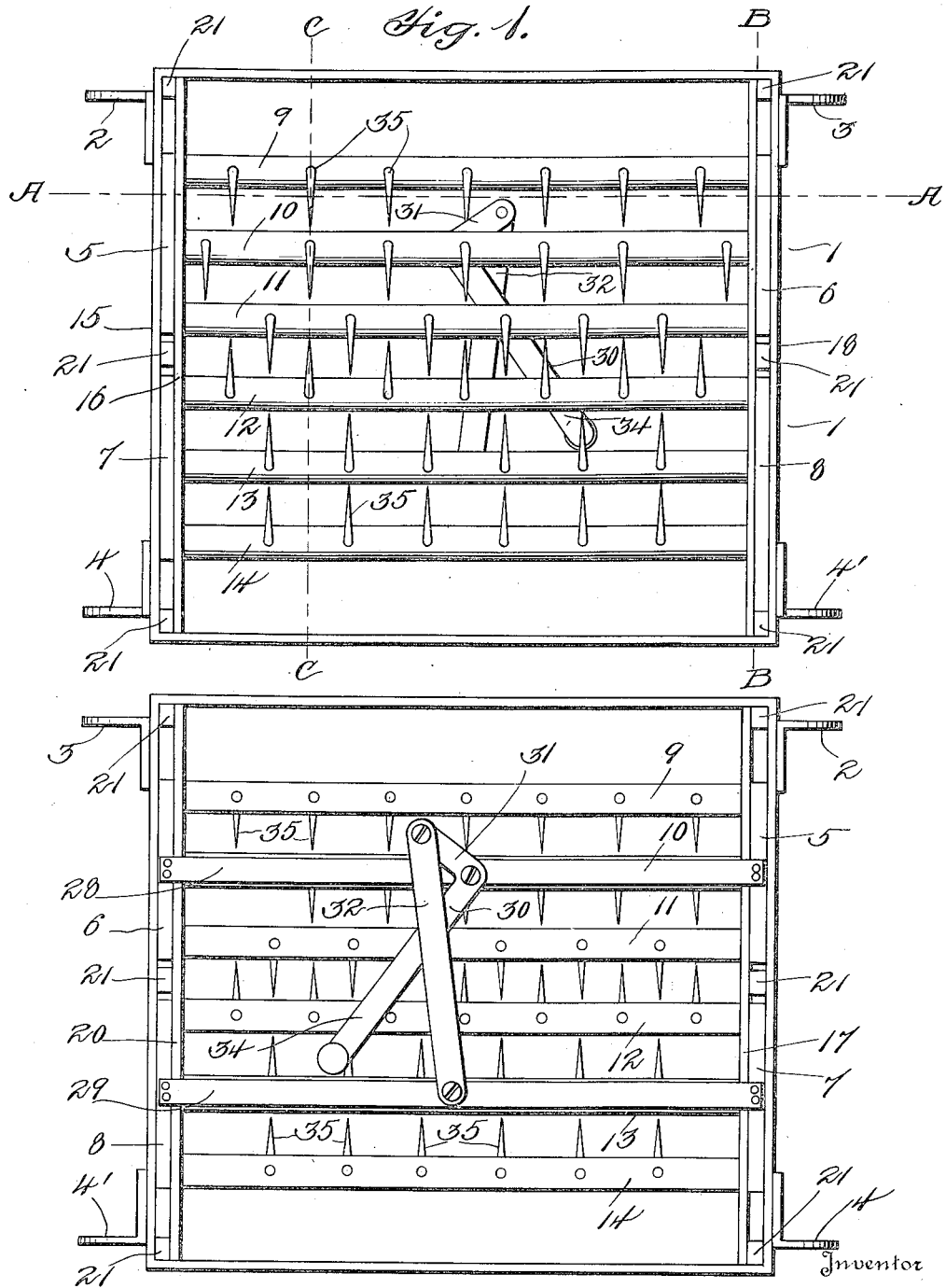
Fig. 2 is a rear elevational view thereof in one position.

Like reference characters indicate corresponding parts throughout the following specification and in the several views of the drawings in which the numeral 1 represents a rectangular frame having brackets 2, 3, 4, and 4', whereby the frame may be secured to a meat slicing machine of any conventional type. 5 and 6 and 7 and 8 are sliding bars arranged in pairs on opposite sides of the frame and mounted for movement toward and from each other. Pivotally mounted in the bars 5 and 6 are hook bars 9, 10 and 11, each carrying curved hooks pointing in the same direction, and in the bars 7 and 8 are pivotally connected similar hook bars 12, 13 and 14, the hooks of which point in the opposite directions. The bars 5 and 7 on one side of the frame are mounted between the side 15 of the frame 1 and spaced guide members 16 and 17, the bars 6 and 8 being mounted between the opposite side 18 of the frame 1 and the guide members 19 and 20. The innermost guide members 16 and 19 have a series of grooves with arcuate walls 22 against which the semi-cylindrical surface 23 of the hook bars engage and ride to effect a half rotation of the hook bars during the sliding movement of the slide bars. The outermost guide members 18 and 20 have a series of grooves with opposingly inclined surfaces 24 and 25 terminating in apexes 26 upon which the inner surface 27 of said hook bars engage, as clearly shown in Figs. 6 and 7.

The sliding bars 5 and 7 are connected by a transverse rod 28 and the bars 6 and 8 are connected by a transverse rod 29. Pivotally mounted upon the bar 28 is a bell crank operating lever 30, the arm 31 of which is pivotally connected to a link 32, the other end of which is pivotally connected to the bar 29 and a knob 33 is secured to the free end of the long arm 34 of said bell crank lever whereby the same may be rocked. The movement of the long arm 34 in one direction forces the bars 28 and 29 apart, separating the hook bars by causing the bars 5 and 7 to slide upwardly and the bars 6 and 8 to slide downwardly, the hook bars 9, 10 and 11 and 12, 13 and 14 operating against the inclined surfaces 24 whereby the hooks 35 are projected outwardly in position to enter a piece of meat placed upon the device. By operating the knob 33 in the opposite direction the bars 28 and 29 are drawn together, swinging the hook bars over the apexes 26 and against the oppositely inclined surfaces 25 whereby the hook bars are made to incline in an opposing direction causing the hooks 35 to turn inwardly toward the hook bars after engaging the meat. Thus the meat will be securely clamped to the device.

The shanks 36 of the hooks 35 are comparatively very short or about the length of the thickness of an ordinary slice of meat. Thus the meat may be sliced right up to the hook and the last slice removed from the hooks by again operating said bell crank lever.

Having thus described my invention, that which is claimed as new and desired to be secured by Letters Patent is:

1. A meat clamp for slicing machines consisting of a frame having a series of movable hook bars, and sliding bars to which certain of said hook bars are pivoted.

2. A meat clamp for slicing machines consisting of a frame having a series of movable hook bars, and sliding bars to which certain of said hook bars are pivoted, and similar sliding bars to which certain other of said hook bars are pivoted.

3. A meat clamp for slicing machines consisting of a frame having a series of movable hook bars, sliding bars to which certain of said hook bars are pivoted, similar sliding bars to which certain other of said hook bars are pivoted, and means for simultaneously operating said sliding bars.

4. A meat clamp for slicing machines consisting of a frame having a series of movable hook bars, sliding bars to which certain of said hook bars are pivoted, similar sliding bars to which certain other of said hook bars are pivoted, means for simultaneously operating said sliding bars, and guides whereby the movement of said pivoted hook bars is controlled.

5. A meat clamp for slicing machines consisting of a frame having a series of movable hook bars, sliding bars to which certain of said hook bars are pivoted, similar sliding bars to which certain other of said hook bars are pivoted, means for simultaneously operating said sliding bars, guides whereby the movement of said pivoted hook bars are controlled, each of said hook bars having a flat surface.

6. A meat clamp for slicing machines consisting of a frame having a series of movable hook bars, sliding bars to which certain of said hook bars are pivoted, similar sliding bars to which certain other of said hook bars are pivoted, means for simultaneously operating said sliding bars, guides whereby the movement of said pivoted hook bars is controlled, each of said hook bars having a flat surface and each of said hook bars having a semi-cylindrical surface.

7. A meat clamp for slicing machines consisting of a frame having a series of movable hook bars, sliding bars to which certain of said hook bars are pivoted, similar sliding bars to which certain other of said hook bars are pivoted, means for simultaneously operating said sliding bars, guides whereby the movement of said pivoted bars is controlled, each of said hook bars having a flat surface and each of said hook bars having a semi-cylindrical surface, said guide bars having surfaces to conform to the surfaces of said hook bars.

8. A meat clamp for slicing machines consisting of a frame having a series of movable hook bars, sliding bars to which certain of said hook bars are pivoted, similar sliding bars to which certain of other of said hook bars are pivoted, means for simultaneously operating said sliding bars, guides whereby the movement of said pivoted hook bars is controlled, each of said hook bars having a flat surface and each of said hook bars having a semicylindrical surface, said guide bars having surfaces to conform to the surfaces of said hook bars.

9. In a clamp, two sets of hook bars arranged to have simultaneous sliding and pivotal movements and means whereby said bars are simultaneously operated.

10. In a clamp, two sets of hook bars arranged to have simultaneous sliding and pivotal movements and means whereby said bars are simultaneously operated in opposite directions.

11. In a clamp, independent sets of hook bars arranged to have simultaneous sliding and pivotal movement, means for simultaneously operating said sets in opposite directions, hooks on said bars, and means whereby said hooks may be projected downwardly and inwardly as the bars pivot.

12. A meat clamp having a frame, two sets of hook bars arranged respectively on opposite sides of the center line of the frame, and means for simultaneously moving both sets of hook bars toward and away from the center line, the hook bars being arranged to rotate during such movement.

In testimony whereof I affix my signature in the presence of two witnesses.

JOHN B. MAINVILLE.

Witnesses:
FRANK D. STANBURY,
CLARA W. RICHARDS.